United States Patent
Wiggs

[11] Patent Number: 5,946,928
[45] Date of Patent: Sep. 7, 1999

[54] MINI TUBE AND DIRECT EXPANSION HEAT EXCHANGE SYSTEM

[76] Inventor: B. Ryland Wiggs, 425 Sims La., Franklin, Tenn. 37069

[21] Appl. No.: 08/915,255

[22] Filed: Aug. 20, 1997

[51] Int. Cl.$^6$ .................................................... F25D 23/12
[52] U.S. Cl. .............................................. 62/260; 165/45
[58] Field of Search ................................... 62/260, 238.7, 62/238.6; 165/45

[56] References Cited

U.S. PATENT DOCUMENTS

| | | | |
|---|---|---|---|
| 2,503,456 | 4/1950 | Smith | 62/115 |
| 3,183,675 | 5/1965 | Schroeder | 61/36 |
| 5,025,634 | 6/1991 | Dressler | 62/79 |
| 5,224,357 | 7/1993 | Galiyano | 62/260 |
| 5,461,876 | 10/1995 | Dressler | 62/160 |
| 5,671,608 | 9/1997 | Wiggs | 62/260 |
| 5,758,514 | 6/1998 | Genung | 62/471 |

*Primary Examiner*—Henry A. Bennett
*Assistant Examiner*—Melvin Jones
*Attorney, Agent, or Firm*—Waddey & Patterson; Mark J. Patterson

[57] ABSTRACT

A direct expansion geothermal heating/cooling system wherein the interior air handler is sized via 100 cubic inches of interior heat exchange tube volume per 12,000 BTUs of maximum design capacity; wherein the thermal expansion valves are sized to the tonnage capacity of the air handler's design; wherein the subterranean heat exchange tubing consists of 1/8 inch to 3/16 inch outside diameter tubing with outside diameter to tube length ratios of between 1/6,400 and 1/9,600, and where the interior diameter to length ratios are between 1/9,411 and 1/18,462; wherein the interior volume of the subterranean heat exchange tubing is within 1% of the interior volume of the interior air handler's heat exchange tubing; wherein at least 40 square feet of subterranean heat exchange tubing is proportionately exposed to a 500 square foot area of earth per 12,000 BTUs of system design capacity; wherein one or more of the subterranean heat exchange tubes are finned, with fins spaced at least 1/4 inch apart; wherein the compressor's design capacity is between 20% and 33.33% less than the interior air handler's design; where the receiver and accumulator are about 20% to 50% smaller than conventionally sized; and where the geothermal heat exchange tubing is accessed via dual, or multiple, distributors and/or is installed in a vertical or angled slot from 1 inch to 1 foot wide, which is backfilled with powdered stone, heat conductive fill, flowable fill, concrete or the like.

13 Claims, 1 Drawing Sheet

MINI TUBE AND DIRECT EXPANSION HEAT EXCHANGE SYSTEM

FIELD OF THE INVENTION

The present invention relates to a wholly or partial direct expansion heat exchange system for use in association with any heating/cooling system and/or power generation system utilizing in-ground and/or in-water heat exchange elements as a primary or supplemental source of heat transfer.

BACKGROUND OF THE INVENTION

Geothermal direct expansion heating/cooling systems are generally well known systems which are essentially "heat pumps", transferring heat via a common refrigeration cycle, from one source to another, with at least one of two or more of the system's heat exchange elements being buried in the ground or submersed in water, such as a lake or pond.

As referenced, Geothermal direct expansion heating/cooling systems include at least one heat exchange element, typically consisting of closed loops of tubing, buried in the ground or submersed in water. These closed loops of tubing may be installed in a variety of manners, including horizontal configurations or helical loops, as well as in various vertical configurations, such as spiraled coils or elongated U-shaped tubes. These subterranean tubes, or loops, typically carry a refrigerant, such as R-22, or the like, in direct expansion heating/cooling systems to assist in effecting heat transfer.

Regarding direct expansion subterranean (below ground/below water surface) heat exchange tube sizing, it is well known that refrigerant charge imbalances exist, in all current system designs, between summer and winter seasons. While, ideally, refrigerant charges should be equivalent, this is presently not the case in any known direct expansion system.

Historically, this interior volume imbalance exists between the interior air heat exchange coils and the exterior, subterranean, heat exchange coils. The resulting refrigerant charge imbalance has been due to three primary reasons: (1) the perceived notion that larger diameter subterranean tubes provide greater heat transfer capacity than smaller diameter tubing, which could be correct when solely evaluating a tube comparison of an equal number of tubes with equal lengths but with varying interior diameters; (2) the perceived notion that more tubing is required below ground in subterranean finnless heat exchange tubing than above ground in the fan assisted air handler containing finned tubing, which could be correct with conventionally designed systems since subterranean tubing must be spaced over an adequate minimum ground area, and therefore cannot normally utilize finned tubing, which could concentrate heat exchange in too small an area to effectively achieve the necessary seasonal overall system heat exchange operational efficiencies; and (3) the perceived notion that the less the number of tubes in the subterranean heat exchanger, the faster the installation, and the lower the initial installation cost, which is generally correct with most direct expansion ground coil design layouts.

As a result, prior art has developed the following ground tube size ratios:

In DE3514191A1 to Waterkote, the use of direct expansion geothermal heat transfer tubing with internal diameter to length ratios of between 1/2857 and 1/3750 was taught.

Aardvark Air, Inc., formerly of 700 Prospect, Kansas City, Mo. 64132, reportedly sold and installed direct expansion systems utilizing 100 foot long, ACR grade (0.03 inch wall thickness), ¼ inch outside diameter copper tubes for the subterranean heat exchanger. These tubes had an external diameter to length ratio of 1/4,800, which ratio was taught and later claimed as proprietary by U.S. Pat. No. 5,025,634 to Dressler, as subsequently assigned to USPower Climate Control, Inc., which manufactured and sold direct expansion systems utilizing the said 1/4,800 ratio.

Further, USPower Climate Control, Inc., formerly of 954 Marion Blvd., Allentown, Pa. 18103, during or about 1990 through 1991, also sold direct expansion systems utilizing 100 foot long, ACR grade (0.032 inch wall thickness), 5/16 inch outside diameter, copper tubes for its subterranean heat exchangers. These tubes had an external diameter to length ratio of 1/3,840.

All of the above-referenced geothermal direct expansion ground coil designs utilize ¼ inch outside diameter, or larger, subterranean heat exchange tubing, which is commonplace among all known direct expansion systems. Further, while the subterranean tube surface area per ton (per 12,000 BTUs) of heating/cooling system design capacity is uncertain in Waterkote's design, all other above-referenced designs utilize a combined tube surface area of about 32.6 square feet to 39.2 square feet per ton of design capacity, which is typically exposed, via a network of approximately equally spaced and arrayed tubing, to a ground surface area of about 500 square feet per ton of design capacity.

Further, in order to combat the aforesaid charge imbalance resulting from the differing interior volume areas in the interior air handler heat exchange coils versus the exterior subterranean heat exchange ground coils, the use of a receiver has traditionally been employed, so as to automatically hold unnecessary refrigerant in reserve within a holding container on the high pressure side of the compressor.

The charge imbalance results when one switches the system from a heating to a cooling mode, or vise a versa. Typically, in the heating mode, the exterior ground coils are the evaporator section of the system and the interior air handler coils are the condenser section. When the system is switched to a cooling mode, the exterior ground coils become the condenser and the interior air handler coils become the evaporator. Since, with conventional geothermal direct expansion systems, the ground coils combined interior volume is greater than that of the air handler's combined interior volume, more liquid refrigerant is required for efficient system operation in the cooling mode than in the heating mode.

The use of a conventionally sized, or larger, receiver to automatically adjust the aforesaid charge imbalance in direct expansion systems is well known. The use of a conventional receiver was taught, although not claimed as proprietary, by U.S. Pat. No. 4,688,717 to Jungwirth. A conventional receiver was reportedly used by the aforesaid Aardvark Air, Inc., in direct expansion systems during or about 1982. A conventional receiver was taught for use in a direct expansion system via a textbook entitled "Modern Refrigeration and Air Conditioning" by Andrew D. Althouse, Carl H. Turnquist, and Alfred F. Bracciano, published by The Goodheart-Willcox Company, Inc., copyright 1975. The use of an oversized 20% total refrigerant quantity capacity receiver in a direct expansion system was claimed as proprietary by U.S. Pat. No. 5,461,876 to Drlessler. Envirotherm Heating and Cooling, Inc., of 105 Forrest Retreat, Hendersonville, Tenn. 37075, marketed and sold a direct expansion system in 1995 which contained an oversized receiver designed to store close to 50% of the total refrigerant quantity. However, the use of any conventionally sized, or larger, receiver in a direct expansion system mandates a certain equipment manufacturing cost for both materials and labor.

Regardless of the extra equipment and manufacturing cost, standard or oversized receivers are necessary in currently designed direct expansion systems in order to reduce system operational inefficiencies otherwise occurring in the heating and/or cooling mode. In fact, if the system's refrigerant charge volume differential between the interior air handler coil volume and the subterranean ground coil volume was too great, absent a receiver, the system could potentially totally fail to reverse cycle (switch to heating mode from cooling mode, or vice a versa).

Regarding the sizing and matching of system components, conventionally, direct expansion systems have been sized by a determination of the subject structure's heating/cooling load, via ACCA Manual J, or similar, BTU heating/cooling load calculation criteria. Thereafter, the compressor is sized to match the calculated BTU load, where one ton of capacity equals 12,000 BTUs. The air handler is sized to match the capacity of the compressor, so that, for example, a manufacturer's three ton compressor is matched with a manufacturer's three ton air handler. The corresponding ground coils are also conventionally sized by the manufacturer to match the conventional compressor and conventional air handler sizing. A commonly used ground coil design would be five 100 foot long, ¼ inch diameter, ACR grade, tubes per ton of compressor capacity. Conventionally, an accumulator and a receiver, designed to match the conventionally sized compressor, or an oversized accumulator and an oversized receiver, together with thermal expansion valves, sized to match the compressor tonnage, are also utilized in direct expansion applications. The best method of sizing and matching system components is an area of critical concern for overall highly efficient system operation.

Lastly, none of the above-referenced in-ground/in-water heat exchangers utilize finned tubing, as is commonly utilized in air source heat pump heat exchange units, so as to increase air surface contact area and so as to correspondingly accelerate heat transfer from the refrigerant to the air, or vise a versa. This absence of finned tubing in ground heat exchange tubing is partially because conventionally sized fins surrounding in-ground heat exchange tubing would be anticipated to inhibit full good ground contact, leaving air pockets between the fins, which air pockets would result in thermal transfer inefficiencies. In typical direct expansion applications, where natural earth is utilized as a fill material, this anticipated concern would likely constitute a valid reason not to utilize conventional finned tubing. Conventional finned tubing may consist of tubing with between 8 to 16 fins per inch of tubing length, with fins typically not extending more than one half inch from the exterior perimeter of the tubing.

Another reason finned tubing has not heretofore been utilized in the ground coils of direct expansion heat pump applications is because the earth surrounding the refrigerant laden in-ground heat transfer tubes is limited in its ability to transfer naturally occurring heat to/from the refrigerant within the heat transfer tubes, which tubes are typically constructed of a metal, such as copper. Consequently, the extra cost involved in utilizing standard finned tubing for geothermal direct expansion heat transfer applications has been deemed an unnecessary expenditure. Consequently, conventional direct expansion applications typically rely on a matrix of finnless tubing (typically ¼ inch to ½ inch in outside diameter) to effect the desired heat transfer with the surrounding soil, or ground, which heat transfer into the surrounding ground is sometimes augmented with an artificial fill material placed around the finnless tubing, such as powdered stone, concrete, flowable fill, or the like.

Yet another problem typically encountered with conventional direct expansion systems arises from the use of a single vapor line with a single distribution point, and a single liquid line, with a single distribution point, to and from the interior equipment from and to the multiple, smaller, subterranean heat exchange tubes. Typically, the single vapor and liquid line sets are kept at an equal length, and require a congregation of the multiple subterranean heat exchange tubes at respective single point for the vapor line and for the liquid line, which diminishes ground contact area with naturally occurring geothermal heat. Worse, these congregation points are often in relatively close proximity to one another, and thereby tend to subject the returning heat exchange lines to the extreme heat or cold of the outgoing heat exchange lines, depending on whether operating in a cooling or a heating cycle, thereby negating some of the positively gained geothermal heat exchange effect. A means of avoiding these problems would increase operational efficiencies.

Further, conventionally designed direct expansion ground coils are installed in a large excavated pit, typically requiring a large front end loader excavator, or a large bucket track hoe; in well holes, either vertical or angled, typically requiring a large well drilling rig; in a trench, typically two feet to eight feet wide, requiring a large bucket back hoe, or track hoe; or via a cylindrical design, typically requiring a telephone pole drilling rig, or the like. As a result, conventionally designed direct expansion ground coils are relatively expensive to install, and require a significant amount of earth moving, which is both time-consuming and relatively expensive, as well as being problematic for landscaping when an installation occurs where there is an established lawn. Further, direct expansion ground coils are typically backfilled with earth, which often results in non-heat-conductive air gaps occasioned by unbroken clods of earth surrounding the subterranean heat exchange tubing.

What is needed is an installation method for direct expansion ground coils that is relatively quick, inexpensive, minimally invasive, highly efficient for ground heat transfer, and safe.

Consequently, it is an object of the present invention to provide a more efficient in-ground/in-water heat transfer design than that conventionally utilized in direct expansion applications for either heating/cooling systems or for power generation systems.

SUMMARY OF THE INVENTION

The present invention teaches how to effectively insure the efficient operation of a geothermal direct expansion heating/cooling system, either without a receiver, or with a smaller than conventionally sized receiver, and with a smaller than conventionally sized accumulator, thereby reducing equipment and manufacturing costs. As an additional benefit, the present invention teaches how to reduce the necessary refrigerant volume in a direct expansion system, thereby reducing the corresponding cost of refrigerant necessary for system operation, and/or thereby reducing refrigerant pumping power requirements, and/or thereby increasing overall system operational efficiencies.

Further, the present invention teaches the best known method of sizing and matching system component parts, comprised of the air handler, the in-ground subterranean tubing, the compressor, the expansion valve, the accumulator, and the receiver, for high efficiency operation, and the present invention teaches how to add and space fins to ground heat transfer tubing backfilled with earth and/or with an artificial fill material. These results are achieved by using a variety of enhancements, which, either singularly or in combination, result in manufacturing cost savings and/or in improved operational efficiencies. The various improvements are summarized as follows:

The larger size of any particular heating/cooling BTU load should initially be determined via ACCA Manuel J load calculations, or other similar design criteria. For example, if the heating load was calculated to be 42,000 BTUs, and the cooling load was calculated to be 48,000 BTUs, the design criteria would be 48,000 BTUs, or four tons.

First, an interior air handler should be selected which contains conventional air handler finned tubing, which finned tubing has a combined interior volume of 100 cubic inches per ton of the greater of the system's heating or cooling design capacity, plus or minus 10%. The manufacturer's listed tonnage size of the air handler is irrelevant, and will vary from manufacturer to manufacturer. The air handler's heat exchange tubing could be constructed in a variety of manners, such as the conventional 3/8" O.D. finned tubing, with 14 fins per inch. As an example, a good match for a four ton design system would be a Trane air handling unit, manufactured by the Trane Company, of 6200 Troup Highway, P.O. Box 9010, Tyler, Tex., 75711, model number TWE048P130FA, which contains a 387 cubic inch interior volume, and which is constructed with 3/8" finned (14 per inch) tubing.

Second, the expansion valve, comprised of a standard, conventional, self-adjusting heating/cooling valve, or valves, must be sized to match the tonnage calculation of the greater of the heating or cooling load.

Third, the subterranean ground tubing should be 100 feet long, plus or minus 10%, and further sized to meet two additional criteria. First, for high efficiency operation, there should be 40 square feet, or more, of tubing surface area in good thermal, equivalently spaced, contact with 500 square feet of earth, at least one foot below the greatest of the frost or heat line. Second, the interior tube volume should be sized to closely match, within about 1%, the total interior air handler's tube volume. For example, when using a Trane TWE048P130FA air handler, containing 387 cubic inches, for a four ton system, the total subterranean tubing surface area should be at least 160 square feet, and the total tubing interior volume should equal 387 cubic inches, plus or minus only about 1%. This can be accomplished by using ACR grade (0.30 inch wall thickness) tubing sized generally between 1/8 inch outside diameter and 3/16 inch outside diameter, which has outside diameter to length ratios of between 1/6,400 and 1/9,600, and which has interior diameter to length ratios of between 1/9,411 and 1/18,462. This subterranean tubing has a small enough interior diameter to sweep entrained compressor oil through the subterranean ground coils and return the oil to the compressor without the need for an oil trap. In this particular case, 44 ACR grade tubes, 100 feet long each, with 2.5/16 inch outside diameters, could be utilized. The interior volume area of the tubes would be 384 cubic inches, which is within 1% of the air handler's 337 interior cubic inches, and the combined surface area of the tubes would be 180 square feet, which is greater than the aforesaid 160 square feet minimum high efficiency design criteria.

Fourth, the 44 ground tubes should be approximately equally spaced over the bottom of a 2,000 square foot pit area, which would be about a 45 foot by 45 foot square area, or other configuration providing the requisite square footage, typically about 4 to 5 feet deep, and laid horizontally ideally on top of a subsurface of 1 inch to 3 inches of powdered stone, together with a cover of an additional 1 inch to 3 inches of powdered stone, or other enhanced heat conductive fill material, such as concrete or flowable fill, or the like, prior to backfilling the excavated pit with native earth. The subject ground tubes could and should also be utilized in a vertical application, such as that described in Wiggs' Advanced In-Ground/In-Water Heat Exchange Unit filed at U.S. patent application Ser. No. 08/530,053, as well as in all other direct expansion designs.

Fifth, a compressor should be utilized with a manufacturer's design capacity of 20% to 33.3% less tonnage than the subject air handler.

Sixth, the accumulator need not be oversized, and should match the air handler tonnage design. Seventh, the receiver, if utilized at all, should be 20% to 50% smaller than a conventional receiver which has been sized to at least match the conventional compressor tonnage. With a design as described above, the interior volume of the interior air handler coils will closely match the interior volume of the subterranean ground coils, and there will be no need for a receiver, unless a smaller than standard size (about 20% to 50% smaller) receiver is utilized to automatically compensate for refrigerant expansion/contraction solely based on seasonal operational temperature differentials and/or potential line set liquid refrigerant containment area seasonal differentials.

A line set is typically comprised of a liquid and a vapor line, connecting the interior air handler and compressor unit with the exterior heat exchange subterranean tubing. The vapor line in the line set is always larger than the liquid line. While the liquid line in the line set always carries liquid refrigerant fluid, the amount of liquid can vary, depending on the season and the surrounding subterranean temperature.

While, via the subject invention, there will be an additional number of tubes to install in the subterranean heat transfer area, the minimal additional labor cost will be offset by the significant reduction in receiver size, and/or by the elimination of a receiver, and/or by the reduction in size of the accumulator, and by increased overall system operational efficiencies.

Further, the above described system design procedure will provide an ultra high operational efficiency direct expansion system, with high operational efficiencies being a primary objective for geothermal direct expansion designs.

Additionally, the present invention teaches, eighth, how to effectively utilize fins on in-ground heat exchange tubing for direct expansion systems. This is accomplished by spacing the individual fins, on the in-ground tubing, distances of 1/4 inch, or greater, apart. One inch, or greater, distance spacing between fins where the ground coils are backfilled and covered with normal fine soil, such as fine topsoil, or silt, or the like, will not inhibit normal ground compaction, and will not typically result in air gaps. Since direct expansion systems operate at relatively high temperature differentials between the refrigerant within the ground heat transfer tubing and the normal surrounding ground temperature, the addition of fins will enhance desired heat transfer, by providing more ground surface contact area of a highly heat conductive material, typically copper, from the refrigerant into the ground surrounding the containment ground tubing in the summer, when the ground acts as a heat sink, and will enhance the desired heat transfer in the opposite direction in the winter, when the ground acts as a heat source.

Fins on the ground heat transfer tubing may be spaced as little as ¼ inch apart when the ground heat transfer tubing is surrounded by a fine crushed stone or by a flowable fill, or concrete, or cement, or the like, which will fill the void spaces between the fins without leaving air gaps.

Fins on ground heat transfer tubing installed in, and backfilled with, a soil tending to clump, or clod, such as a clay soil, or the like, should be spaced at least six inches apart so as to help avoid unfilled pockets of air, which are very poor heat conductors, and which inhibit the desired heat transfer into, or out of, the ground to the refrigerant circulating within the heat transfer tubing.

Ninth, the aforesaid problems encountered via conventional direct expansion subterranean heat exchange coils congregating in one place at the liquid line distributor, and in one place at the vapor line distributor, which are often in relatively close proximity to one another due to the use of relatively equally lengthed line sets, and which, when in close proximity at hot/cold temperature extremes, tend to negate some of the geothermal heat exchange advantage, can be overcome via the use of dual or multiple distributors.

A single vapor line and a single liquid line, of equal lengths, can still be run from the interior equipment to the perimeter of the geothermal heat exchange tube array. Thereafter, a first set of distributors can transfer the refrigerant fluid to a second set of smaller multiple lines, of approximate equal length, which will convey the refrigerant fluid to a second respective set of distributors, which will convey the hot/cold refrigerant fluid to additional, smaller, multiple, but minimally congregating, geothermal heat exchange tubing. It is presently well known that line sets should be insulated when in close proximity (within 10 feet to 15 feet) of one another, which practice should continue to be followed.

Lastly, and tenth, the subject invention teaches how to install a safe, minimally invasive, low cost direct expansion ground coil configuration. This is accomplished via utilization of a small back-hoe, or a "Ditch Witch" minimal width trencher, or the like, which excavates a slot in the ground to a typical depth of about 6 feet to 15 feet, with a slot width between one inch and one foot. A matrix of direct expansion ground coils, spaced some pre-determined distance apart, depending on whether finned or unfinned, and depending on the width of the excavated slot in the earth, are lowered into the excavated slot, which is thereafter backfilled with powdered stone, or cement, or concrete, or flowable fill, or the like. It would be best to pump a flowable fill mixture in from the bottom and let it fill the excavated slot via rising to the top, so as to eliminate as many potential non-heat-conductive air gaps as possible.

The one inch to one foot width of the excavated slot is small enough to prevent a workman from accidentally falling in and subjecting himself to potential injury or death via a subsequent unforeseen cave in of the excavated area. Further, the use of a small width excavator is minimally invasive, and will provide a means for a relatively quick and inexpensive ground coil installation.

BRIEF DESCRIPTION OF THE DRAWINGS

For the purpose of illustrating the invention, there are shown in the drawings forms which are presently preferred; it being understood, however, that the invention is not limited to the precise arrangements and instrumentality's shown.

DETAILED DESCRIPTION OF THE PREFERRED EMBODIMENTS

Figure 1:
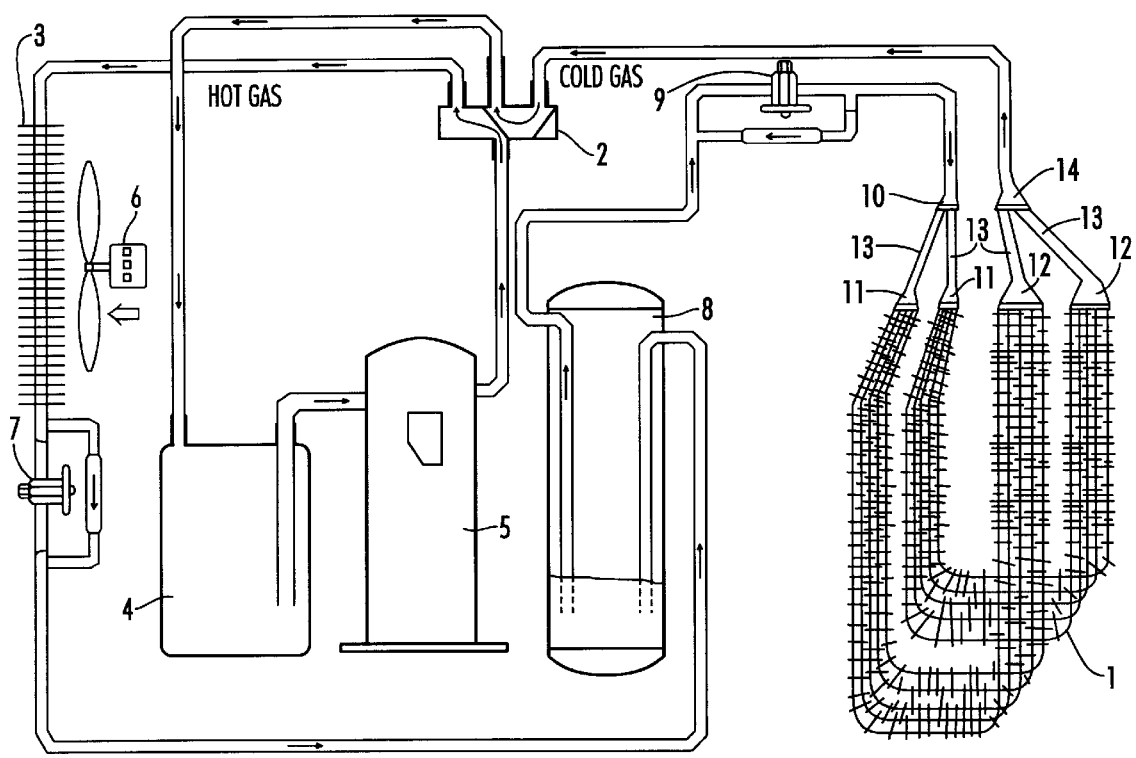
FIG. 1 is an isometric view of a simple version of a direct expansion geothermal heat pump system, operating in a heating mode, including ground heat exchange tubes, interior air heat exchange coils, a fan, thermal expansion valves, a compressor, an accumulator, a receiver, a reversing valve, two liquid distributors, and two gas distributors. Various controls, the thermostat, the electric power source, and other common items are not shown since the design of same is well know by those in the refrigeration trade.

The following detailed description is of the best presently contemplated mode of carrying out the invention. The description is not intended in a limiting sense, and is made solely for the purpose of illustrating the general principals of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a simple version of a direct expansion geothermal heat pump system, operating in a heating mode.

A refrigerant fluid (not shown) is evaporated into a gas in finned ground heat exchange tubing 1. The vaporized refrigerant travels through a second line set vapor (gas) distributor 12 through multiple line sets 13, through a first line set vapor (gas) distributor 14, through a single line set, through a reversing valve 2, utilized for reversing the direction of the refrigerant fluid through the ground heat exchange tubing 1 and through the finned air heat exchange tubing 3 when the system is operating in a cooling mode, to an accumulator 4, which traps any liquid refrigerant fluid so as to help prevent any liquid from entering into the refrigerant gas compressor 5. The refrigerant fluid, in a cool gaseous state, exits the accumulator 4, and enters the refrigerant gas compressor 5, where it is compressed into a hot gaseous, or vapor, state.

The hot refrigerant gaseous fluid thereafter travels through the reversing valve 2 to the finned air heat exchange tubing 3 where heat is removed from the hot refrigerant gaseous fluid and transferred to interior air via assistance from an electric fan 6.

The refrigerant fluid thereafter travels past one thermal expansion valve (TX valve) 7, for use in cooling mode operation, through a receiver 8, through a heating mode thermal expansion valve (TX valve) 9, through the first line set liquid distributor 10, through multiple line sets 13, through a second line set liquid distributor 11, into the subterranean finned ground heat exchange tubing 1, where the entering cooled and condensed refrigerant fluid absorbs heat from the ground, is vaporized, and exits through the second line set vapor distributor 12, where the process is repeated until enough heat is supplied to the interior structure (not shown) to satisfy the interior thermostat (not shown), which disengages system operation.

I claim:

1. A direct expansion geothermal heat exchange system where the subterranean heat exchange tubing consists of tubing with an outside diameter of between ⅛ inch outside diameter and 3/16 inch outside diameter, where the outside diameter to individual tube length ratios are between 1/6,400 and 1/9,600, and where the interior diameter to individual tube length ratios are between 1/9,411 and 1/18,462.

2. The direct expansion geothermal heat exchange system of claim 1, further comprising:
   an air handler constructed with conventional air handler finned tubing in fluid connection with said subterranean heat exchange tubing, wherein said air handler finned tubing has a combined interior volume of 100 cubic inches per 12,000 BTU's of the greater of the system's heating or cooling design capacity in tonnage.

3. The direct expansion geothermal heat exchange system of claim 2, further comprising:

a self-adjusting thermal expansion valve in fluid connection with said subterranean heat exchange tubing, wherein said valve is sized to match the greater of the system's heating or cooling design capacity in tonnage.

4. The direct expansion geothermal heat exchange system of claim 1, further comprising:

interior air handler heat exchange tubing in fluid connection with said subterranean heat exchange tubing, wherein the interior volume of said subterranean heat exchange tubing is within one percent of the interior volume of said interior air handler heat exchange tubing.

5. The direct expansion geothermal heat exchange system of claim 4, wherein:

the exterior surface area of said subterranean heat exchange tubing is greater than 40 square feet of exterior surface area per 12,000 BTU's of the greater of the system's heating or cooling design capacity in tonnage.

6. The direct expansion geothermal heat exchange system of claim 5, wherein:

said exterior surface area is exposed to 500 square feet of subterranean ground surface per 12,000 BTU's of the design capacity.

7. The direct expansion geothermal heat exchange system of claim 1, further comprising:

fins on said subterranean heat exchange tubing, wherein said fins are spaced a minimum of one quarter inch apart.

8. The direct expansion geothermal heat exchange system of claim 1, further comprising:

a receiver in fluid connection with said subterranean heat exchange tubing, wherein said receiver has a, maximum storage capacity of 18% of the total volume of system refrigerant.

9. The direct expansion geothermal heat exchange system of claim 1, further comprising:

an accumulator in fluid connection with said subterranean heat exchange tubing, and and air handler wherein said accumulator has a maximum design capacity equal to the design capacity of said air handler.

10. The direct expansion geothermal heat exchange system of claim 1, further comprising:

a tubing containment slot, wherein said slot is between one inch and one foot wide and extends up to a depth of 25 feet;

said subterranean heat exchange tubing placed into said slot, wherein said tubing is selected from a group containing both finned and un-finned tubings; and a backfill material to fill in said slot around said tubing, wherein said backfill material is selected from a group containing powdered stone, fine stone, powdered metal, fine metal, heat conductive sand, heat conductive soil, heat conductive silt, cement, concrete, flowable fill, heat conductive gel, heat conductive grout, heat conductive fluid, and other heat conductive material in fine, powdered, and granular consistencies.

11. The direct expansion geothermal heat exchange system of claim 1, further comprising:

at least two lengths of approximately equal length liquid and vapor line sets constructed from said subterranean heat exchange ground tubing; and at least two liquid and vapor distributors connected to said subterranean heat exchange ground tubing.

12. A geothermal heat exchange system wherein the compressor's BTU design capacity is between 20% and 33.33% less than the interior air handler's BTU design capacity for any given heating or cooling load.

13. A direct expansion geothermal heat exchange system, comprising:

subterranean heat exchange tubing;

an air handler constructed with conventional air handler finned tubing in fluid connection with said subterranean heat exchange tubing, wherein said air handler finned tubing has a combined interior volume of 100 cubic inches per 12,000 BTU's of the greater of the system's heating or cooling design capacity in tonnage;

a self-adjusting thermal expansion valve in fluid connection with said subterranean heat exchange tubing, wherein said valve is sized to match the greater of the system's heating or cooling design capacity in tonnage; and an accumulator in fluid connection with said subterranean heat exchange tubing, wherein said accumulator has a maximum design capacity equal to the design capacity of said air handler.

\* \* \* \* \*